(12) United States Patent
Jenson et al.

(10) Patent No.: US 10,740,085 B2
(45) Date of Patent: Aug. 11, 2020

(54) WEBSERVER INTERFACE FOR DEPLOYMENT MANAGEMENT TOOL

(71) Applicant: Target Brands, Inc., Minneapolis, MN (US)

(72) Inventors: Jeffrey Michael Jenson, Andover, MN (US); Nicholas John Notto, St. Paul, MN (US); Dana Catherine Hazen, Minnetonka, MN (US); Ram Mohan Varma Nandimandalam, Maple Grove, MN (US); Sri Rama Sarat Chandra Nandula, Smyrna, GA (US); Susan Marie Woitalewicz, Osseo, MN (US); Kumaraguru Janakiraman Duraiswamy, Tamilnadu (IN)

(73) Assignee: Target Brands, Inc., Minneapolis, MN (US)

(*) Notice: Subject to any disclaimer, the term of this patent is extended or adjusted under 35 U.S.C. 154(b) by 0 days.

(21) Appl. No.: 16/206,630

(22) Filed: Nov. 30, 2018

(65) Prior Publication Data
US 2020/0174770 A1  Jun. 4, 2020

(51) Int. Cl.
*G06F 9/445* (2018.01)
*G06F 9/54* (2006.01)
(Continued)

(52) U.S. Cl.
CPC ............ *G06F 8/65* (2013.01); *H04L 41/0293* (2013.01); *H04L 67/34* (2013.01); *G06F 8/20* (2013.01);
(Continued)

(58) Field of Classification Search
CPC .... G06F 16/27; G06F 16/9574; G06F 21/128; G06F 21/44; G06F 21/10; G06F 8/61;
(Continued)

(56) References Cited

U.S. PATENT DOCUMENTS 6,138,158 A * 10/2000 Boyle ..................... H04L 67/02
                                              709/206
6,654,786 B1 * 11/2003 Fox ......................... H04L 29/06
                                              709/203

(Continued)

OTHER PUBLICATIONS

Jacek Chmielewski et al., Appication Architectures for Smart Multi-Device Applications, Dec. 3-7, 2012, [Retrieved on May 28, 2020]. Retrieved from the internet: <URL: https://dl.acm.org/doi/pdf/10.1145/2405172.2405177> 5 Pages (1-5) (Year: 2012).*

(Continued)

*Primary Examiner* — Anibal Rivera
(74) *Attorney, Agent, or Firm* — Westman, Champlin & Koehler, P.A.; Theodore M. Magee

(57) ABSTRACT

A computer-implemented method includes submitting a description of devices to a webserver and receiving an identifier for the devices from the webserver. Information related to an application to be deployed is submitted to the webserver and an identifier for the application is received from the webserver. A request is submitted to the webserver to deploy the application to the devices, where the request includes the identifier for the devices and the identifier for the application. The request to deploy the application is independent of which deployment management tool is used to deploy the application to the devices.

18 Claims, 10 Drawing Sheets

(51) Int. Cl.
*H04L 12/24* (2006.01)
*G06F 8/65* (2018.01)
*H04L 29/08* (2006.01)
*G06F 8/71* (2018.01)
*G06F 8/20* (2018.01)
*G06F 8/61* (2018.01)

(52) U.S. Cl.
CPC .......... *G06F 8/61* (2013.01); *G06F 8/62* (2013.01); *G06F 8/71* (2013.01); *H04L 41/022* (2013.01); *H04L 41/0233* (2013.01); *H04L 41/12* (2013.01)

(58) Field of Classification Search
CPC ..... G06F 8/71; G06F 8/62; G06F 8/20; G06F 8/63; G06F 8/60; G06F 8/65; G06F 9/4411; G06F 9/4451; G06F 9/445; G06F 11/3409; H04L 41/0293; H04L 41/0233; H04L 41/022; H04L 41/12; H04L 67/34
See application file for complete search history.

(56) References Cited

U.S. PATENT DOCUMENTS

| | | | |
|---|---|---|---|
| 7,209,921 B2* | 4/2007 | Pace | G06F 9/544 |
| 7,458,082 B1* | 11/2008 | Slaughter | G06F 9/547 |
| | | | 713/153 |
| 7,552,055 B2* | 6/2009 | Lecoeuche | H04M 3/4938 |
| | | | 704/270.1 |
| 8,296,756 B1 | 10/2012 | Feeser et al. | |
| 8,533,178 B1* | 9/2013 | Abraham | G06F 16/951 |
| | | | 707/713 |
| 8,549,327 B2* | 10/2013 | Mayer | G06Q 10/06 |
| | | | 713/193 |
| 8,671,097 B2* | 3/2014 | Wu | G06F 11/3409 |
| | | | 707/736 |
| 8,959,507 B2 | 2/2015 | Shen et al. | |
| 9,081,747 B1* | 7/2015 | Tabieros | G06F 9/4411 |
| 9,197,696 B1* | 11/2015 | Jakatdar | H04L 67/1097 |
| 9,311,104 B1 | 4/2016 | Feeser et al. | |
| 9,357,378 B1* | 5/2016 | Delker | H04W 4/60 |
| 9,424,018 B2* | 8/2016 | Wong | G06Q 30/0603 |
| 9,477,455 B2* | 10/2016 | Avisror | G06F 8/61 |
| 9,658,983 B1* | 5/2017 | Barber | G06F 16/219 |
| 9,699,195 B2* | 7/2017 | Ito | G06F 21/10 |
| 9,727,522 B1* | 8/2017 | Barber | G06F 9/5016 |
| 9,992,268 B2* | 6/2018 | Atsatt | H04L 67/38 |
| 10,101,983 B2* | 10/2018 | Beckman | G06F 8/656 |
| 10,177,962 B2* | 1/2019 | Haraszti | H04L 41/022 |
| 10,193,971 B2* | 1/2019 | Zeng | G06F 8/61 |
| 2003/0060896 A9* | 3/2003 | Hulai | G06F 9/451 |
| | | | 700/1 |
| 2003/0074207 A1* | 4/2003 | Pace | H04L 69/329 |
| | | | 709/204 |
| 2003/0078958 A1* | 4/2003 | Pace | G06F 9/544 |
| | | | 709/201 |
| 2003/0131150 A1* | 7/2003 | Sugiura | G06F 9/4411 |
| | | | 719/321 |
| 2004/0003390 A1* | 1/2004 | Canter | G06F 8/61 |
| | | | 717/178 |
| 2005/0114871 A1* | 5/2005 | Wolff | G06F 9/445 |
| | | | 719/331 |
| 2006/0036941 A1* | 2/2006 | Neil | G06F 9/451 |
| | | | 715/234 |
| 2006/0168239 A1* | 7/2006 | Gauthier | H04L 63/0209 |
| | | | 709/227 |
| 2007/0143446 A1* | 6/2007 | Morris | G06F 8/61 |
| | | | 709/219 |
| 2007/0244987 A1* | 10/2007 | Pedersen | H04L 67/06 |
| | | | 709/217 |
| 2008/0016187 A1* | 1/2008 | Neil | G06F 9/451 |
| | | | 709/220 |
| 2008/0020737 A1* | 1/2008 | Neil | G06F 9/44505 |
| | | | 455/414.1 |
| 2008/0222628 A1* | 9/2008 | Batra | G06F 9/44526 |
| | | | 717/171 |
| 2009/0037287 A1* | 2/2009 | Baitalmal | G06F 21/105 |
| | | | 705/27.1 |
| 2009/0037337 A1* | 2/2009 | Baitalmal | G06Q 99/00 |
| | | | 705/59 |
| 2009/0037452 A1* | 2/2009 | Baitalmal | G06F 16/27 |
| 2009/0037492 A1* | 2/2009 | Baitalmal | H04L 67/34 |
| 2009/0265361 A1* | 10/2009 | Nagami | G06F 9/5072 |
| 2010/0088354 A1* | 4/2010 | Wu | G06F 11/3476 |
| | | | 707/827 |
| 2010/0185875 A1* | 7/2010 | Mayer | G06F 16/20 |
| | | | 713/189 |
| 2010/0306735 A1* | 12/2010 | Hoff | G06F 8/60 |
| | | | 717/109 |
| 2011/0067023 A1* | 3/2011 | Chiyo | G06F 8/61 |
| | | | 717/177 |
| 2011/0179040 A1* | 7/2011 | Bessonov | G06F 16/955 |
| | | | 707/747 |
| 2011/0191366 A1* | 8/2011 | Eustace | G06F 40/14 |
| | | | 707/769 |
| 2012/0117620 A1* | 5/2012 | Cassidy | H04L 67/306 |
| | | | 726/3 |
| 2012/0159468 A1* | 6/2012 | Joshi | G06F 8/61 |
| | | | 717/172 |
| 2012/0210442 A1* | 8/2012 | Ito | G06F 21/10 |
| | | | 726/26 |
| 2012/0246291 A1* | 9/2012 | Wong | G06F 8/61 |
| | | | 709/224 |
| 2012/0254352 A1* | 10/2012 | Ito | G06F 16/9574 |
| | | | 709/217 |
| 2012/0284704 A1* | 11/2012 | Friedman | G06F 8/61 |
| | | | 717/177 |
| 2013/0097659 A1* | 4/2013 | Das | H04W 12/08 |
| | | | 726/1 |
| 2013/0115872 A1* | 5/2013 | Huang | H04L 69/22 |
| | | | 455/3.01 |
| 2013/0139139 A1 | 5/2013 | Mallur et al. | |
| 2013/0166357 A1* | 6/2013 | Eggs | G06Q 10/06 |
| | | | 705/7.36 |
| 2013/0198266 A1* | 8/2013 | Kiley | H04L 67/34 |
| | | | 709/203 |
| 2013/0246944 A1* | 9/2013 | Pandiyan | H04L 41/22 |
| | | | 715/760 |
| 2013/0326502 A1* | 12/2013 | Brunsman | G06F 8/61 |
| | | | 717/178 |
| 2013/0332582 A1* | 12/2013 | Yoshimura | H04L 67/02 |
| | | | 709/219 |
| 2014/0089395 A1* | 3/2014 | Atsatt | G06F 16/958 |
| | | | 709/203 |
| 2014/0137080 A1* | 5/2014 | Huang | G06F 11/3409 |
| | | | 717/121 |
| 2015/0170072 A1* | 6/2015 | Grant | H04L 67/02 |
| | | | 705/7.36 |
| 2015/0220308 A1* | 8/2015 | Condon | G06F 8/20 |
| | | | 717/104 |
| 2015/0319252 A1* | 11/2015 | Momchilov | H04L 67/42 |
| | | | 709/223 |
| 2016/0085533 A1* | 3/2016 | Jayanti Venkata | H04L 67/02 |
| | | | 717/175 |
| 2016/0086207 A1* | 3/2016 | Tajima | G06F 16/285 |
| | | | 705/7.33 |
| 2016/0239281 A1* | 8/2016 | Avisror | G06F 8/65 |
| 2016/0241436 A1* | 8/2016 | Fourie | H04L 47/2425 |
| 2016/0259804 A1* | 9/2016 | Subramaniam | G06F 16/168 |
| 2016/0277496 A1* | 9/2016 | Zeng | G06F 16/9535 |
| 2017/0039055 A1 | 2/2017 | Uppal et al. | |
| 2017/0063994 A1* | 3/2017 | Lei | H04L 67/12 |
| 2017/0170977 A1* | 6/2017 | Rao | H04L 12/2814 |
| 2017/0317882 A1* | 11/2017 | Bitincka | H04L 67/34 |
| 2017/0323087 A1* | 11/2017 | Kline | H04L 9/0869 |
| 2017/0339095 A1* | 11/2017 | Lei | H04L 41/12 |
| 2017/0366521 A1* | 12/2017 | Lei | H04L 63/02 |
| 2017/0366525 A1* | 12/2017 | Takagi | H04L 9/3247 |
| 2018/0048729 A1* | 2/2018 | Duvdevani | H04L 67/2814 |
| 2018/0165139 A1* | 6/2018 | Kolodzieski | G06F 8/70 |
| 2018/0197144 A1* | 7/2018 | Frank | H04L 63/101 |

(56) References Cited

U.S. PATENT DOCUMENTS

| | | | |
|---|---|---|---|
| 2018/0349149 A1* | 12/2018 | Chute | G06F 9/45529 |
| 2019/0081932 A1* | 3/2019 | Kumar | H04L 63/0876 |
| 2019/0104128 A1* | 4/2019 | Carol | H04L 12/1863 |
| 2019/0121631 A1* | 4/2019 | Hua | H04L 67/34 |
| 2019/0207866 A1* | 7/2019 | Pathak | H04L 41/5051 |
| 2019/0253430 A1* | 8/2019 | Gamache | H04L 63/0853 |
| 2019/0340287 A1* | 11/2019 | Tamjidi | G06F 16/212 |
| 2020/0034216 A1* | 1/2020 | Kolodzieski | G06F 8/70 |

OTHER PUBLICATIONS

Debasis Bandyopadhyay et al., Internet of Things: Applications and Challenges in Technology and Standardization, Apr. 9, 2011, [Retrieved on May 28, 2020]. Retrieved from the internet: <URL: https://link.springer.com/content/pdf/10.1007/s11277-011-0288-5.pdf> 21 Pages (50-69) (Year: 2011).*

Webpage, https://blogs.msdn.microsoft.com/mcsuksoldev/2013/05/14/building-an-sccm-self-service-portal-for-deploying-applications-part-1-background/, Building an SCCM Self Service Portal for Deploying Applications—Part 1, 6 pages, 2013.

Webpage, https://blogs.msdn.microsoft.com/mcsuksoldev/2013/05/14/building-an-sccm-self-service-portal-for-deploying-applications-part-2-design/, Building an SCCM Self Service Portal for Deploying Applications—Part 2, 8 pages, 2013.

Webpage, https://blogs.msdn.microsoft.com/mcsuksoldev/2013/05/14/building-an-sccm-self-service-portal-for-deploying-applications-part-3-example-code/, Building an SCCM Self Service Portal for Deploying Applications—Part 3, 32 pages, 2013.

Webpage, Microsoft, https://docs.microsoft.com/en-us/sccm/core/clients/deploy/about-client-installation-properties#BKMK_attributevalues, About Client Installation Properties in System Center Configuration Manager, 11 pages, 2017.

* cited by examiner

WEBSERVER INTERFACE FOR DEPLOYMENT MANAGEMENT TOOL

BACKGROUND

Code deployment is a process for sending new applications and updates for existing applications to computing devices over a network connection. For large-scale enterprises having thousands of computing devices, deployment management tools are typically used to manage when applications and updates are deployed to the various computing devices and to control which computing devices will receive which applications and updates.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes submitting a description of devices to a webserver and receiving an identifier for the devices from the webserver. Information related to an application to be deployed is submitted to the webserver and an identifier for the application is received from the webserver. A request is submitted to the webserver to deploy the application to the devices, where the request includes the identifier for the devices and the identifier for the application. The request to deploy the application is independent of which deployment management tool is used to deploy the application to the devices.

In accordance with a further embodiment, a method includes while preventing direct access by a submitter to a deployment management tool, receiving a request to create a deployment together with an identifier for a collection and an identifier for an application from the submitter. At least one method in the deployment management tool is called to create the deployment so that the deployment is used by the deployment management tool to deploy the application to devices associated with the collection.

In accordance with a still further embodiment, a webserver includes an application resource having a uniform resource identifier and instructions for processing requests to create applications in a deployment management tool that reference the application resource. The webserver also includes a collection resource having a second uniform resource identifier and instructions for processing requests to create collections in the deployment management tool that reference the collection resource. The webserver further includes a deployment resource having a third uniform resource identifier and instructions for processing requests to create a deployment in the deployment management tool based on an application created by referencing the application resource and a collection created by referencing the collection resource.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Deployment management tools are complex programs used to deploy new applications and update patches to computing devices in an enterprise system. Such deployment management tools require users to interface with a large number of user interface screens in order to define the various parameters required for a deployment of an application or a patch. Users unfamiliar with the deployment management tool find it difficult to navigate through all the different user interface pages in order to create and schedule a deployment. In addition, users who are unfamiliar with the deployment management tool tend to introduce a large number of errors into the deployment management tool when given direct access to the tool. In particular, direct access to the deployment management tool allows users to change settings in the deployment management tool that will cause a deployment to fail.

The embodiments described below improve the operation of deployment systems by reducing the number of user interfaces that a user has to navigate in order to create a deployment while also preventing the user from directly accessing the deployment management tool and thereby reducing the number of errors that a user can introduce into a deployment.

Figure 1:
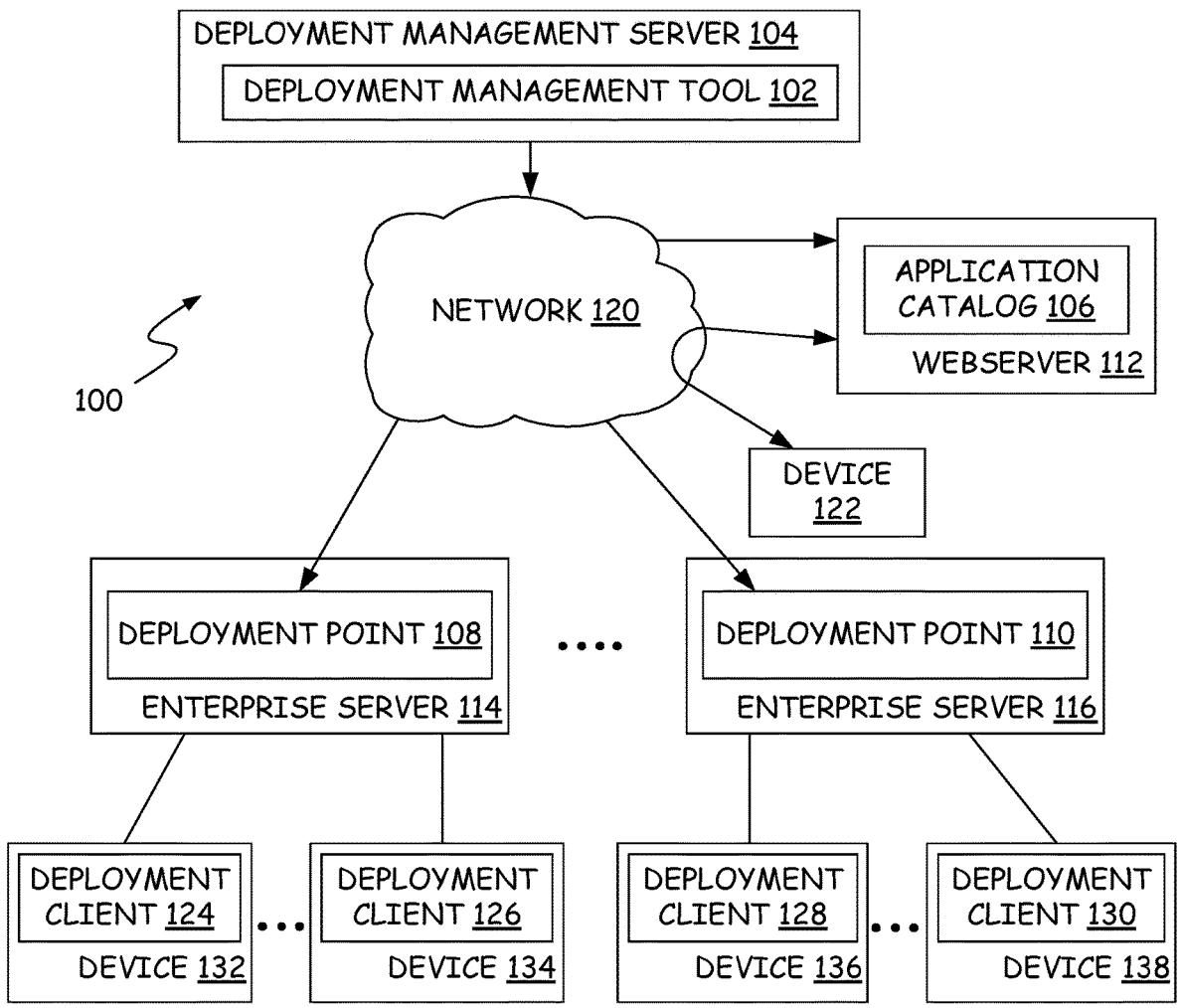
FIG. 1 is a block diagram of a system for deploying applications and updates.

FIG. 1 provides a block diagram of a system 100 used to deploy applications and update patches. In system 100, a deployment management tool 102 running on a deployment management server 104 transmits installation and update packages to one or more application catalogs 106 and deployment points, such as deployment points 108 and 110. Application catalog 106 runs on a webserver 112 while deployment points 108 and 110 run on respective enterprise servers 114 and 116. Devices, such as device 122, receive updates from application catalog 106 by directing a web browser within the device to the application catalog 106 through network 120. Alternatively, devices can use a deployment client, such as deployment clients 124, 126, 128 and 130 running on client devices 132, 134, 136 and 138 to access a deployment point in one of the enterprise servers so as to retrieve the installation or update package. Once a device has downloaded an installation package, it invokes an install command provided as part of the installation package to install the application or update on the device.

Figure 2:
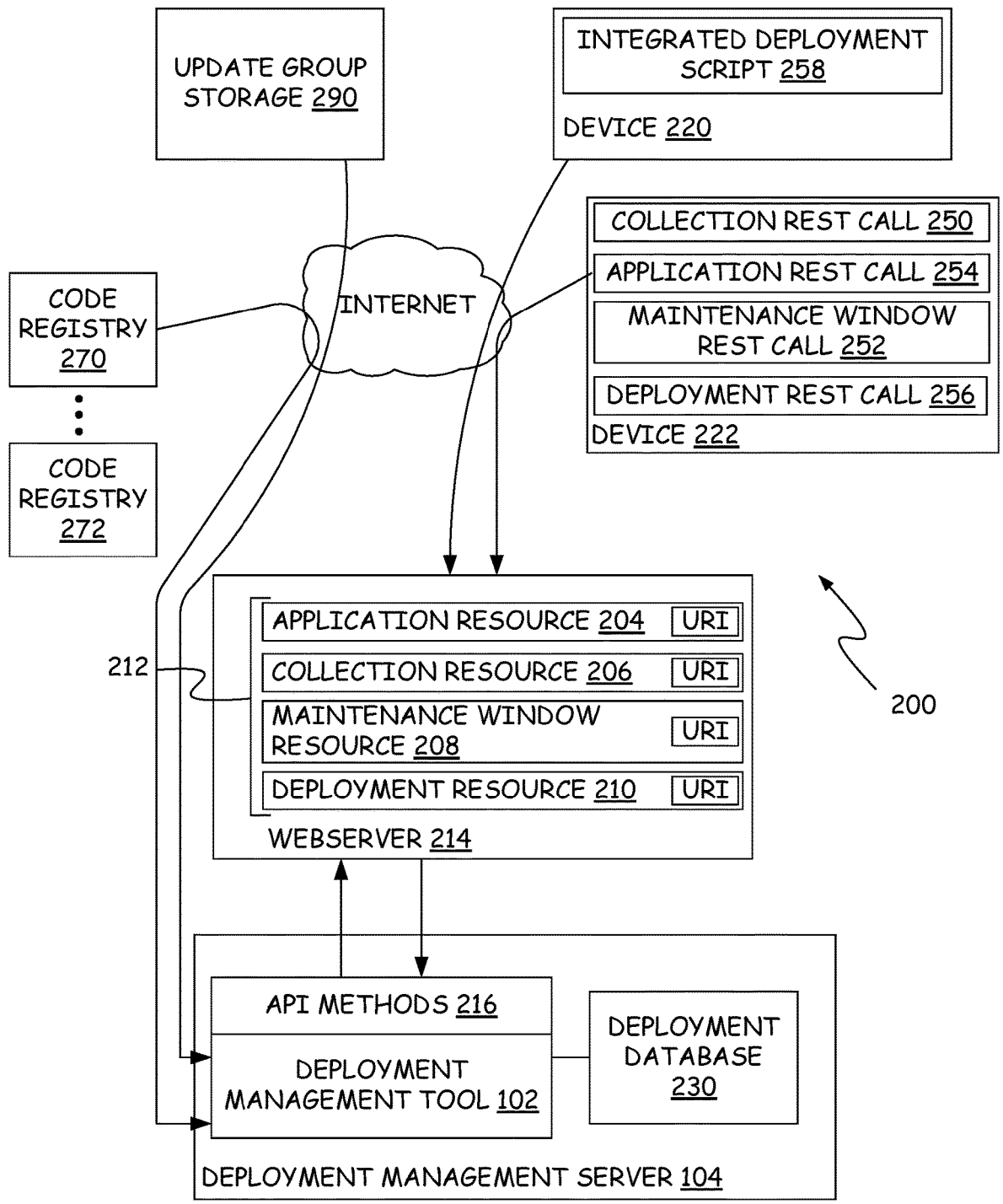
FIG. 2 is a block diagram of a system for controlling a deployment management tool while preventing direct access to the deployment management tool in accordance with one embodiment.

FIG. 2 provides a block diagram of a system 200 for creating a deployment in deployment management tool 102 while preventing direct access to deployment management tool 102. In system 200, a webserver 214 supports various HTTP method calls relative to a collection of resources 212 so as to provide an interface between external devices, such as devices 220 and 222 and deployment management tool 102 on deployment management server 104. In particular, webserver 214 interacts with deployment management tool 102 through one or more API methods 216 on deployment management server 104 where API methods 216 are able to call methods within deployment management tool 102 directly.

The collection of resources 212 include an application resource 204, a collection resource 206, a maintenance window resource 208 and a deployment resource 210, which each have a respective uniform resource identifier (URI). In accordance with one embodiment, webserver 214 supports at least one HTTP request method for each resource URI, such as GET, POST, PUT, and DELETE, for example. Each resource corresponds to an object used by deployment management tool 102 and stored in a deployment database 230. Thus, application resource 204 corresponds to Application objects that describe applications that are to be deployed, collection resource 206 corresponds to Collection objects that describe collections of devices or users that are to receive deployed applications, maintenance window resource 208 corresponds to Maintenance Window objects that describe time periods when devices associated with a collection can receive a deployment and deployment resource 210 corresponds to Deployment objects that describe parameters of deployments. In general, if the GET method is supported for a resource, web server 214 will use deployment management tool 102 to retrieve one or more corresponding objects from deployment database 230; if the POST method is supported, web server 214 will use deployment management tool 102 to create a new corresponding object in deployment database 230; if the PUT method is supported, web server 214 will use deployment management tool 102 to change a corresponding object in deployment database 230; and if the DELETE method is supported, web server 214 will use deployment management tool 102 to remove a corresponding object from deployment database 230.

Figure 3:
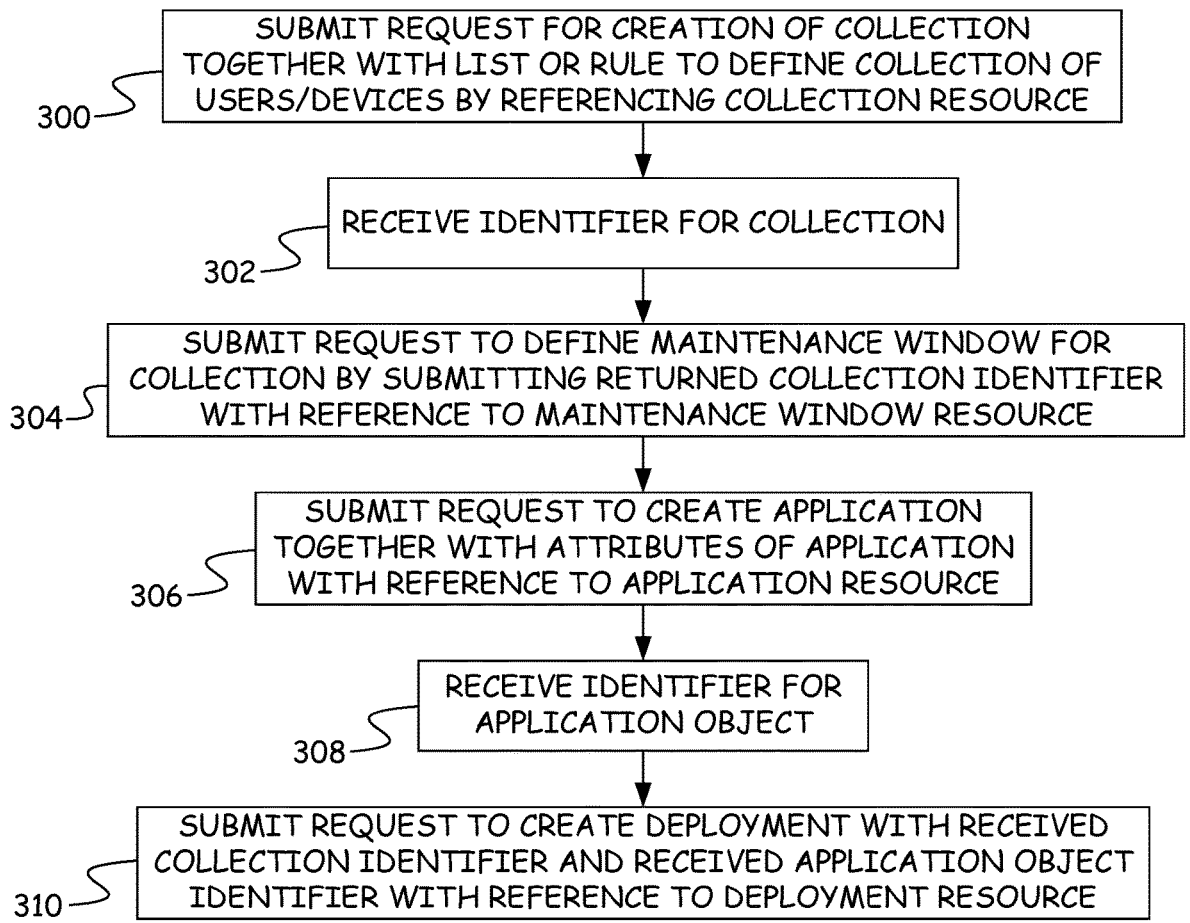
FIG. 3 is a flow diagram of a method of deploying an application in accordance with one embodiment.

FIG. 3 provides a flow diagram of a method for creating a deployment using system 200 of FIG. 2. In step 300, a device, such as device 220 or device 222, submits a description of devices to include in a collection as part of a request for the creation of a collection. In accordance with one embodiment, this request is a Collection ReST call 250 for the creation of a collection of devices that takes the form of:
 POST/collection URI HTTP/1.1
 Content-type: application/JSON
 Authorization: OATH access token
 key: consumer key
 collection_name: Name of collection
 comment: Description of collection
 owned_by_this_site: True
 limit_to_collection_id: collection ID
 rule_name: name
 folder_id: Identifier for folder
 device_list: [device ID, device ID . . . ]
 query: query to add devices
 include_collection_ids: [list of collection IDs]
 exclude_collection_ids: [list of collection IDs]

In accordance with another embodiment, the request is a Collection ReST call 250 for the creation of a collection of users that takes the form of:
 POST/collection URI HTTP/1.1
 Content-type: application/JSON
 Authorization: OAUTH access token
 key: consumer key
 collection_name: Name of collection
 comment:Description of collection
 owned_by_this_site: True
 limit_to_collection_id: collection ID
 rule_name: name
 folder_id: Identifier for folder
 user_group_list: Identifier of group of users
 include_collection_ids: [list of collection IDs]
 exclude_collection_ids: [list of collection IDs]

The two HTTP requests described above both include a request line including an HTTP method of POST, the URI of collection resource 206, and the version of HTTP. The next three lines after the request line contain the header of the HTTP request, with each line containing an attribute:value pair. After the header, there is a blank line followed by the body of the request. The first attribute:value pair in the header indicates the format of the information in the body. In the embodiments shown above, the body has an application/JSON format, which also provides attribute:value pairs. The header also includes an authorization attribute, which provides an OAUTH access token and a key attribute, which provides a consumer key for accessing the deployment management tool.

The body of the request includes a description of the collection to be created by providing a list of attribute:value pairs. In the body, the "collection_name" attribute is a name to assign to the newly created collection and the "comment" attribute is a description of the collection to be created. The "limit_to_collection_id" attribute limits the members of this collection to devices and users that are part of the collection identified for this attribute. The "folder_id" attribute provides the identifier for a location in the deployment management tool where this collection should be created. For device collections, the collection can be defined either using the "device_list" attribute and providing a list of device IDs or using the "query" attribute and providing a pattern (text and wildcards) or query for identifying devices to include in the collection. If the query attribute is used, the "rule_name" attribute is used to assign a rule name to the pattern or query. For user collections, the users can be identified from a "user_group" list attribute, which identifies a list of user groups that this collection targets. The "include_collection_ids" attribute provides a list of collections containing devices or users that should be included in the collection being created. The "exclude_collection_ids" parameter provides a list of collections containing devices or users that should be excluded from the present collection. The "limit_to_collection_id", the "include_collection_ids", the "exclude_collection_ids", the "device_list", the "query", and the "user_group" list each provide a description of devices that are to be included in the collection with the "user_group" list indirectly describing the devices by providing a description of users who use the devices.

Figure 4:
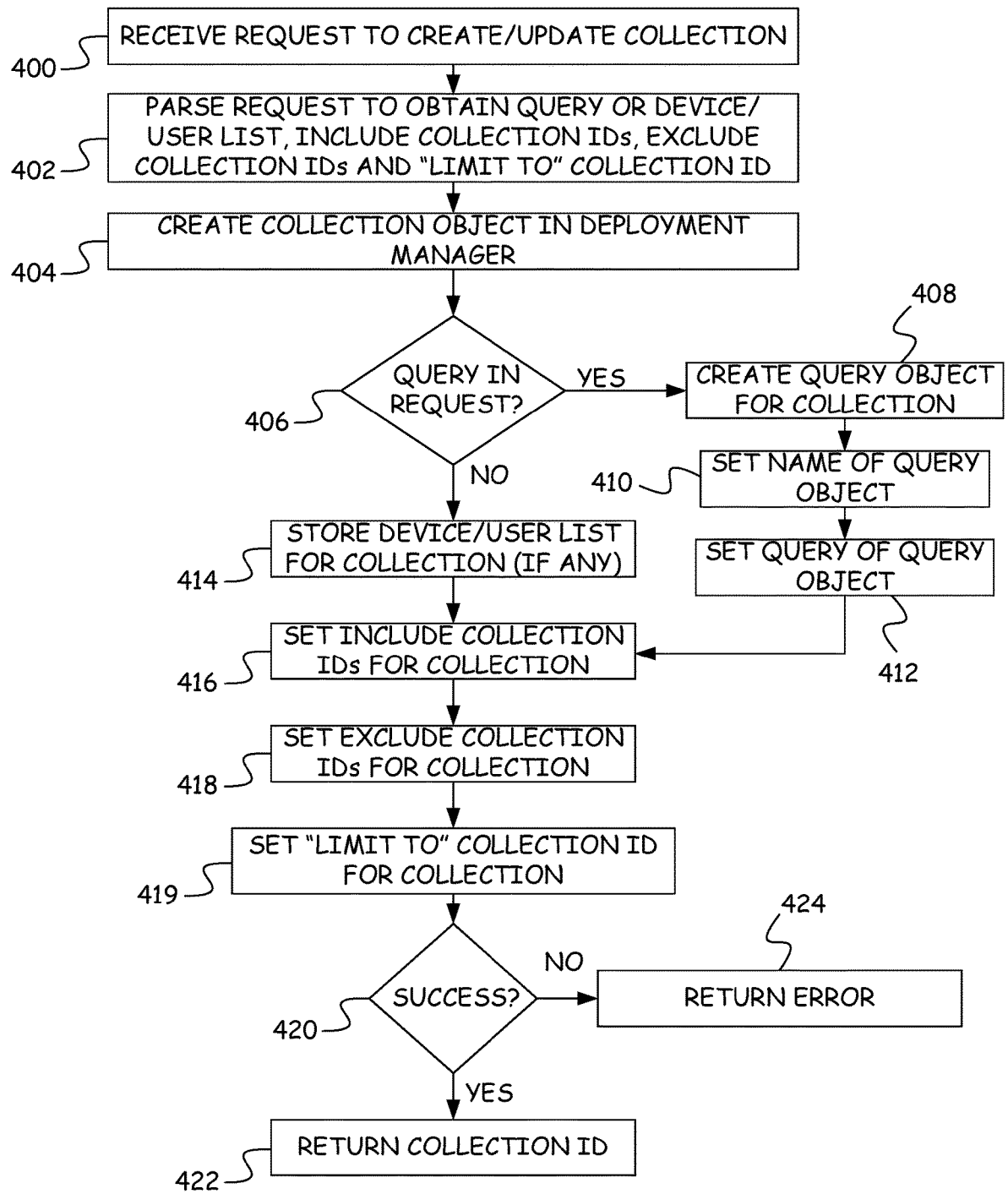
FIG. 4 is a flow diagram of a method performed using a collection resource in accordance with one embodiment.

FIG. 4 provides a flow diagram of a method performed by webserver 214 upon receiving a request to create a collection. In step 400 of FIG. 4, webserver 214 receives the request to create the collection, which includes receiving a description of the devices to include in the collection. At step 402, the webserver parses the request to retrieve the query or device/user list used to form this collection, the collection IDs of collections to include in the present collection, the collection IDs of collections to exclude from this collection, and the collection ID of the collection that the devices/users are limited to coming from, if any. Webserver 214 then uses API methods 216 to create a collection object in deployment management tool 102 at step 404. The created collection object is stored in deployment database 230 and is assigned a collection ID by deployment management tool 102. If a query was provided in the request at step 406, a query object is created for the collection at step 408 and the name of the query object is set to the rule name provided in the request at step 410. The query provided in the request is then set as the query for the query object at step 412. If a query was not provided in the request, then a list of devices/users was provided instead. At step 414, the list of devices or the identifier of the user group is stored as part of the collection object.

At step 416, the include collection IDs are set for the collection and at step 418, the exclude collection IDs are set for the collection. At step 419, the "limit to" collection ID is set for the collection.

If all of the operations described above succeed, the identifier for the newly created collection is returned at step 422. If one of the steps above does not succeed at step 420, an error is returned in the return message from web server 214 to client device 220/222 at step 424.

Once a collection has been created, the attributes of the collection can be retrieved by sending an HTTP GET request to webserver 214 with the identifier for the collection placed at the end of the URI for collection resource 206. In response to the GET request, webserver 214 uses API methods 216 to request the attribute values of the collection from deployment management tool 102 and returns the attribute:value pairs for the collection to the requesting device. A list of collection IDs that have been created can be retrieved by sending an HTTP GET request to webserver 214 with just the URI for collection resource 206.

Returning to FIG. 3, at step 302, the collection ID returned at step 422 of FIG. 4 is received. The collection ID represents an identifier for the devices described in the request for the collection. This ends collection ReST call 250 to collection resource 206.

At step 304, a description of a maintenance window to associate with the devices of the created collection is sent to the webserver. In accordance with one embodiment, the description is sent as part of maintenance window ReST call 252 executed on device 222. Maintenance window ReST call 252 is directed to maintenance window resource 208 and in accordance with one embodiment, takes the following form:

POST/maintenance window URI HTTP/1.1
Content-type: application/JSON
Authorization: OAUTH access token
key: consumer key
name: name of maintenance Window
collection_id: ID of collection that maintenance window is to be applied to
recurrence_type: none, monthly or weekly
start_time: Date/time when application can start to be deployed to collection,
hour_duration: maximum length of window,
day: day of week when maintenance window should open if reoccurring
week: week of month when maintenance window should open if reoccurring monthly The request line includes a POST command followed by the URI of maintenance window resource 208 and the version of HTTP. The header of the request is similar to the header of the collection request discussed above. The body of the request includes a description of the maintenance window using a series of attribute:value pairs. The "name" attribute provides a name to assign to the maintenance window and a "collection_id" attribute identifies the collection ID of the collection that the maintenance window is to be applied to. The "recurrence_type" attribute indicates whether the maintenance window is not to recur or is to recur on a weekly or monthly basis. The "start_time" attribute in the body designates a date and time when an application can start to be deployed to the collection. The "hour_duration" parameter indicates the length of the maintenance window after the start time during which the application can be deployed. For maintenance windows that recur weekly or monthly, the "day" attribute designates the day of the week when the maintenance window should reopen. For maintenance windows that recur monthly, the "week" attribute indicates which week of the month the maintenance window should open.

Thus, the maintenance window designates a period of time and one or more dates during which an application may be deployed to the devices listed in a collection of devices or devices operated by a collection of users.

Figure 5:
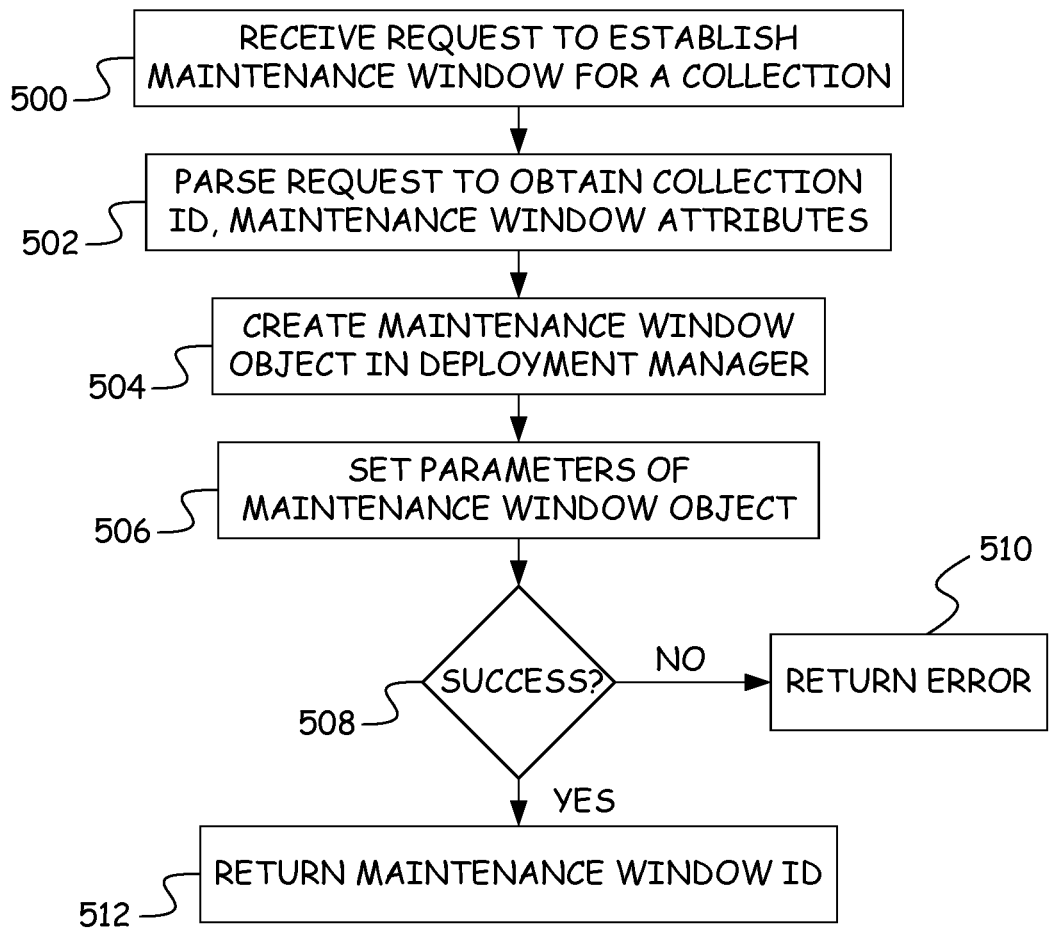
FIG. 5 is a flow diagram of a method performed using a maintenance window resource in accordance with one embodiment.

FIG. 5 provides a flow diagram of a method performed by webserver 214 and API methods 216 upon receiving a request to create a maintenance window using maintenance window resource 208. In step 500, the request to establish a maintenance window for a collection is received by webserver 214 through a reference to the maintenance window resource 208's URI. At step 502, webserver 214 parses the request to obtain the collection ID and the attribute of the maintenance window. At step 504, webserver 214 interacts with deployment management tool 102 through API methods 216 to create a maintenance window object. The created maintenance window object is stored in deployment database 230 and is assigned an identifier by deployment management tool 102. At step 506, the parsed attributes are used to set the parameters of the maintenance window object. If all of the steps are performed successfully at step 508, the identifier for the maintenance window object is returned by webserver 214 to maintenance window ReST call 252 at step 512. If an error occurs while any of the steps are being performed, an error is returned by webserver 214 to maintenance window ReST call 252 at step 510.

After requesting the creation of the maintenance window at step 304, the process of creating a deployment in FIG. 3 continues at step 306 where information related to an application to be deployed is submitted to the webserver. In accordance with one embodiment, the information is submitted as part of a request to create an application in an application ReST call 254, which references application resource 204's URI. In accordance with one embodiment, application ReST call 254 takes the forms of:

POST/application URI HTTP/1.1
Content-type: application/JSON
Authorization: OAUTH access token
key: consumer key
application_name: name of Application
publisher: name of publisher of application
auto install: True/False
software_version: version of application
keywords: [List of keywords to for searching in Application Catalog/Software Center]
description: short description of what the application is
folder_id: identifier of folder where application is to be stored content_source: path to code registry containing application
   requirement_rules: [list of rules to be applied to devices]
   distribution_point_group_name: group of distribution points for distributing application
   dependent_application_ids: [List of applications that must be on device]
   install_command_line: <install command>
   uninstall_command_line:<uninstall command>
   detection:<script to detect>

Figure 6:
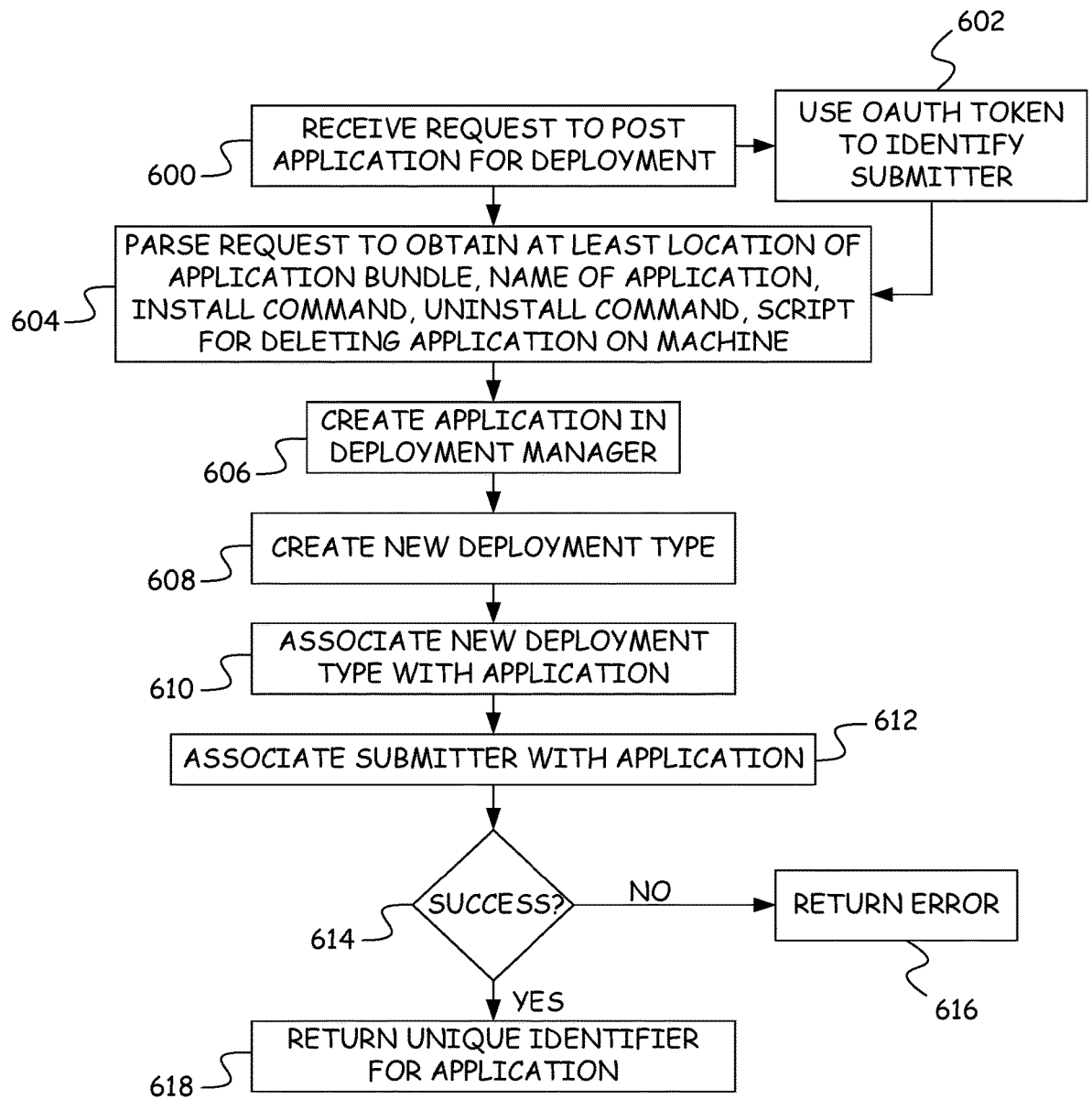
FIG. 6 is a flow diagram of a method performed using an application resource in accordance with one embodiment.

The attributes in the body of the request provide information related to the application to be deployed. The "application_name", "publisher", "software_version", and "description" attributes provide the name, publisher, version of the application, and a short description of what the application is, respectively, which are to appear in any application catalog/software center that the application is to be placed in as part of the deployment. The "keywords" attribute provides a list of keywords that will be used to tag the application in the application catalog/software center for the purposes of retrieving the application through searches in the application catalog/software center. The "auto_install" attribute indicates whether the application can be installed as part of a sequence. The "folder_ids" attribute identifies a folder in deployment database 230 where the application is to be stored for deployment. The "content_source" attribute indicates the path to a code registry, such as code registries 270 and 272 of FIG. 2 where the installation files for the application are currently store. The "distribution_point_group_name" attribute provides the name of a group of distribution points from which the application will be distributed to individual devices. In accordance with one embodiment, such distribution points include one or more application catalogs and one or more distribution centers. The "dependent_application_ids" attribute provides a list of applications that must be on the device. The "requirement_rules" attribute provides a list of operating system types and versions that the device must be running in order for the application to be installed. The "install_command_line" attribute provides an install command that will trigger the installation of the application after the application has been downloaded to the device. The "uninstall_command_line" attribute provides an uninstall command to remove the application from the device. The "detection" attribute provides a script that can be used to detect whether the application is already installed on the device FIG. 6 provides a flow diagram of a method used by webserver 214 to create an application through deployment management tool 102 when application resource 204 is called with a POST request that references application resource 204's URI. In step 600, the POST request is received by webserver 214 and at step 602, webserver 214 parses the OAUTH token to identify the submitter. At step 604, webserver 214 parses the request to obtain the location of the application installation bundle, the name of the application, the install command, the uninstall command, and the script for detecting the application on a machine. At step 606, webserver 214 uses API methods 216 to create an application object in the deployment management tool 102. In accordance with one embodiment, creating the application involves storing the name of the application, the description of the application, the keywords for the application, and the location of the installation files for the application in database 230 as well as creating and storing an identifier for the application. At step 608, webserver 214 uses API methods 216 to create a new deployment type. In accordance with one embodiment, creating the new deployment type involves setting the install command, as well as the detection script, an installation start in location folder and an uninstall start in location folder. At step 610, the new deployment type is associated with the new application object. At step 612, the application is associated with the identifier of the submitter of this request. If all of the preceding steps were performed successfully at step 614, the identifier for the created application object is returned at step 618 to application ReST call 254. If an error occurred at any point, the error is returned at step 616.

Once an application has been created, the attributes of the application can be retrieved by sending an HTTP GET request to webserver 214 with the identifier for the application placed at the end of the URI for application resource 204. In response to the GET request, webserver 214 uses API methods 216 to request the attribute values of the application from deployment management tool 102 and returns the attribute:value pairs for the application to the requesting device. A list of application IDs that have been created can be retrieved by sending an HTTP GET request to webserver 214 with just the URI for application resource 204.

Using application ReST call 254, it is also possible to delete an application from deployment management tool 102. In accordance with one embodiment, such delete requests take the form of:
   DELETE/application URI/{APPLICATION ID} HTTP/1.1
   Content-type: application/JSON
   Authorization: OAUTH access token
   key: consumer key The request line includes a reference to the HTTP DELETE method and a reference to the URI of application resource 204 together with the application ID of the application to be deleted. The header contains the same information as the application POST request.

Figure 7:
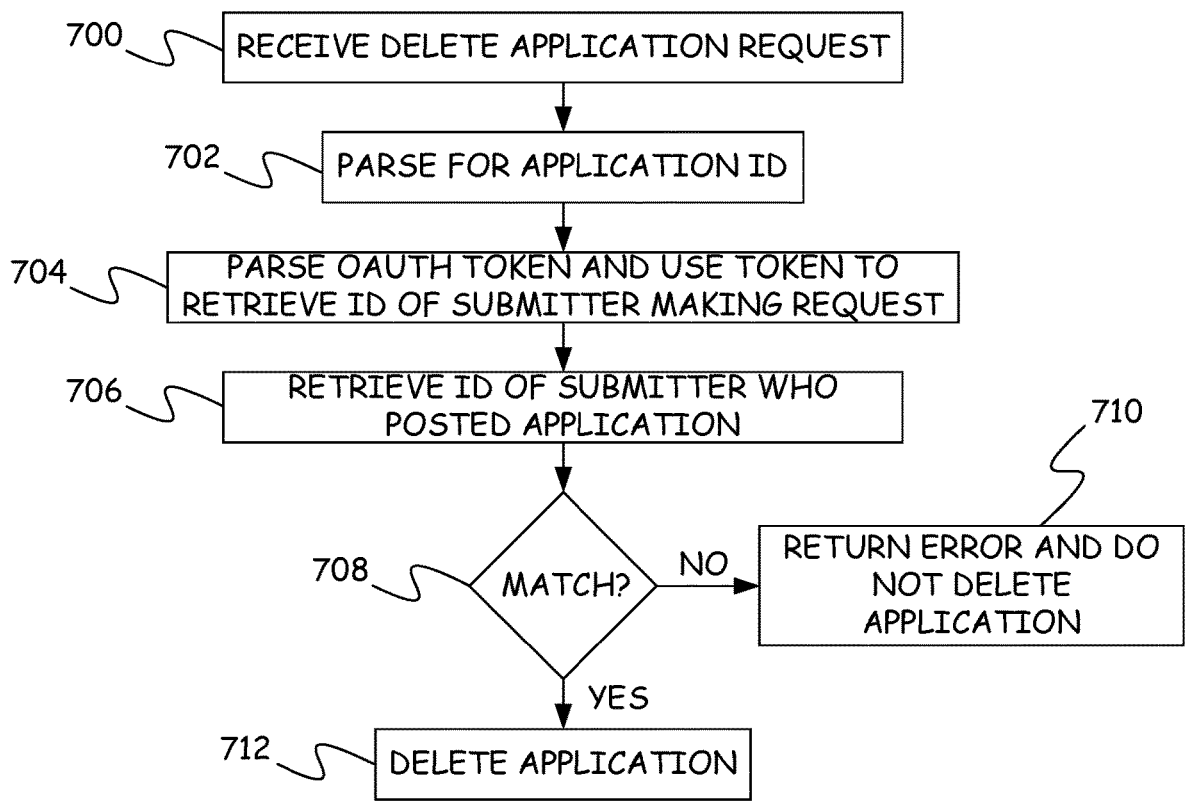
FIG. 7 is a flow diagram of a second method performed using an application resource in accordance with one embodiment.

FIG. 7 provides a flow diagram of a method performed by webserver 214 to delete an application. At step 700, webserver 214 receives a reference to the URI of application resource 204 together with the DELETE method name. At step 702, the application ID is parsed from the URI of application resource 204 and at step 704, the OAUTH token is parsed from the header of the DELETE request. Webserver 214 uses the OAUTH token to identify the ID of the submitter making the delete request. At step 706, webserver 214 uses API methods 216 to retrieve the ID of the submitter who POSTed the application causing the application to be created in deployment management tool 102. At step 708, the ID of the submitter of the DELETE request and the ID of the submitter of the POST request for the application are compared to determine if they match. If they do not match, an error is returned and the application is not deleted at step 710. If they do match, the application is deleted at step 712. Thus, webserver 214 provides protection against accidental deletion of an application in deployment management tool 102 by preventing submitters other than the submitter who posted the application from deleting the application from deployment management tool 102.

Returning to the method of FIG. 3 for creating a deployment, after the application is created at step 306, the identifier for the application object is received by application ReST call 254 from webserver 214 at step 308. At step 310, a request is submitted to the webserver to deploy the application to the devices. In accordance with one embodiment, the request is made through a deployment ReST call 256 on device 222, which submits a request to create a deployment using deployment resource 210 while passing the received collection identifier and the received application identifier. In accordance with one embodiment, the request for creation of the deployment is submitted as:

POST/deployment URI HTTP/1.1
Content-type: application/JSON
Authorization: OAUTH access token
key: consumer key
application_id: Identifier of Application to be deployed
collection_id: Identifier of user or device collection that Application is to be deployed to
offer_type_id: Required/Available
desired_config_type: Install/Uninstall,
start_time: Date/time to make deployment available
enforcement_deadline: Date/Time by which devices must accept deployment
use_gmt_times: True/False
override_service_windows: True/False
reboot_outside_of_service_windows: True/False
require_approval: True/False
notify_user: True/False
wol enabled: True/False
deployment_description: Description of deployment where the request includes a request line containing the POST method and a reference to the deployment URI. The request also includes a header similar to the header found in the other requests described above. The body of the request includes the application ID for the application to be deployed and the collection ID for the collection of devices or users that the application is to be deployed to. The "offer_type_id" attribute indicates whether the deployment is required or is simply to be made available. The "desired_config_type" attribute indicates whether the deployment is an install deployment or an uninstall deployment. The "start_time" attribute indicates the date and time that the deployment is to be made available and the "enforcement_deadline" attribute indicates the date and time by which devices must accept the deployment if the deployment is required. The "use GMT_times" attribute indicates whether the time will be based on the client time or on UTC time. The "override_service_windows" attribute indicates whether the application can be installed outside of a service window defined by a maintenance window for the collection or whether it can only be installed within a service window. The "reboot_outside_of_service_windows" attribute indicates whether the device can be rebooted outside of a maintenance window defined for the collection or whether the installation must wait for a service window before rebooting. The "require_approval" attribute indicates whether prior approval is required before a user can deploy the application from the application catalog. The "notify_user" attribute sets a user experience setting and the "wol_enabled" attribute sends wake up packets for a device when set to true. The "deployment_description" parameter provides a description of the deployment.

Figure 8:
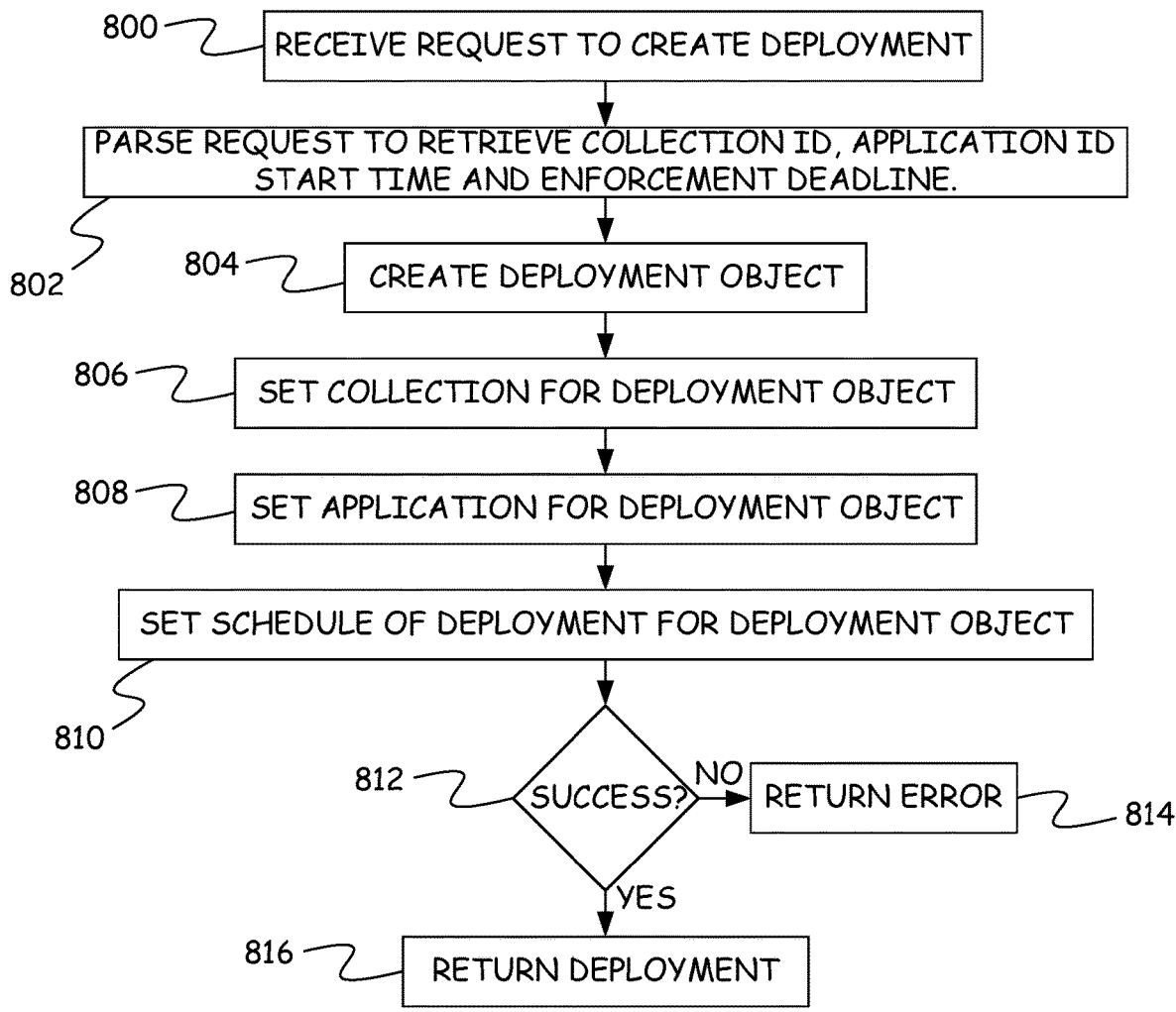
FIG. 8 is a flow diagram of a method performed using a deployment resource in accordance with one embodiment.

FIG. 8 provides a flow diagram of a method performed by webserver 214 and API methods 216 to create a deployment. In step 800, a POST request to create the deployment is received from deployment ReST call 256 by webserver 214. At step 802, webserver 214 parses the request to retrieve the collection ID, the application ID, the start time, and the enforcement deadline, if any. At step 804, webserver 214 uses API methods 216 to create a deployment object in deployment management tool 102. In accordance with one embodiment, this involves storing an identifier for the deployment object in deployment database 230. At step 806, webserver 214 sets the collection for the deployment object to the parsed collection ID. At step 808, webserver 214 uses API methods 216 to set the application for the deployment object to the parsed application ID. At step 810, webserver 214 uses API methods 216 to set the schedule of the deployment for the deployment object. If all of the above steps above succeed at step 812, webserver 214 returns the deployment ID at step 816. If any of the steps fail, webserver 214 returns an error to deployment ReST call 256 at step 814. Once the deployment has been created, deployment management tool 102 will use the schedule stored for the deployment to trigger the deployment and the information associated with the identified application and the identified collection will be used by deployment management tool 102 to locate and deploy the installation files for the application and to distribute them to the devices represented by the collection.

Note that all of the ReST calls discussed above are independent of the deployment management tool that is used to implement the deployment. As a result, webserver 214 allows different deployment management tools to be used without requiring changes to the ReST calls. This simplifies the coding required for the ReST calls by allowing one set of ReST calls to be created for all deployment management tools. In addition, if a different deployment management tool is later selected, the code on every device used to request a deployment does not have to be changed. Instead, only the code on webserver 214 needs to be changed to work with the new deployment management tool. This improves deployment technology by reducing the amount of work required when the deployment tool changes.

In the discussion above, the ReST calls, such as collection ReST call 250, maintenance window ReST call 252, application ReST call 254 and deployment ReST call 256 were shown to be distinct elements located within device 222. In other embodiments, these calls are integrated together to form an integrated deployment script, such as integrated deployment script 258 in device 220. Such an integrated deployment script can include each of these ReST calls in a sequence together with error management code so as to allow the entire deployment to be created while making a single call to the integrated deployment script 258.

Figure 9:
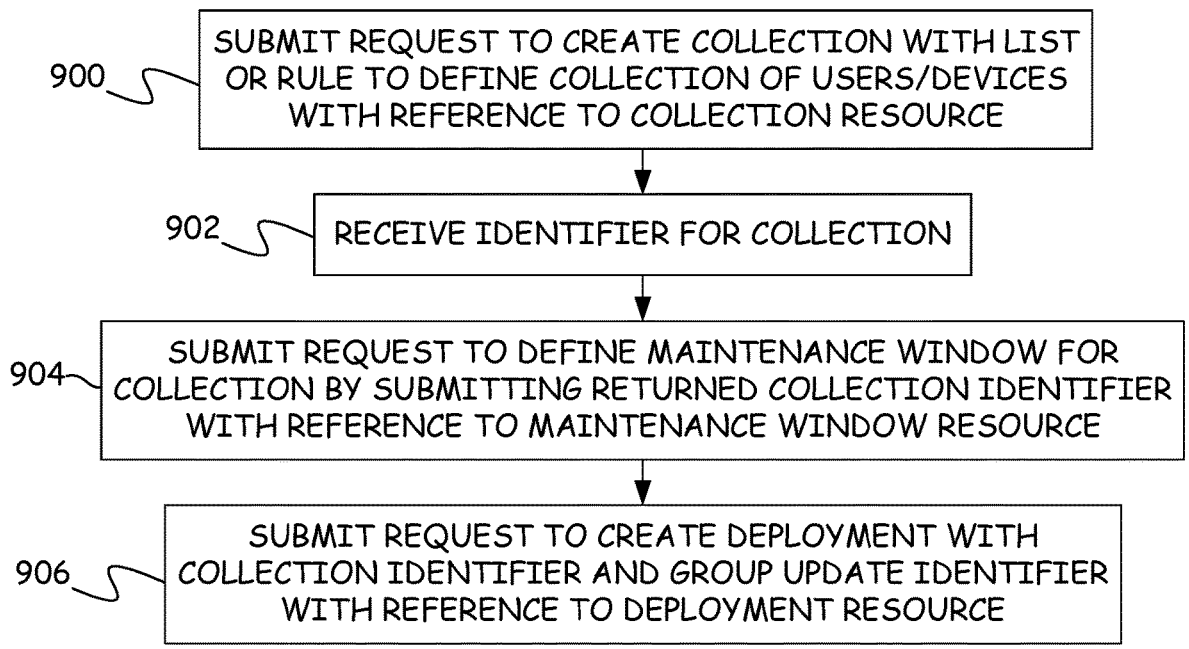
FIG. 9 is a flow diagram of a method of controlling a deployment management tool through resources to perform an update on devices in an enterprise in accordance with one embodiment.

In accordance with a further embodiment, webserver 214 can be used to create a deployment for a software update while preventing direct access to deployment management tool 102. FIG. 9 provides a flow diagram of one method of creating such a deployment. In step 900, collection ReST call 250 is used to create a collection of users/devices that are to receive the deployed update. Webserver 214 processes the request for the collection in an identical manner to that discussed above in FIG. 4. At step 902, the identifier for the collection is returned by webserver 214 to collection ReST call 250. At step 904, a maintenance window ReST call 252 is used to submit a request to webserver 214 for the creation of a maintenance window by referring to maintenance window resource 208. This submission includes the identifier of the collection returned at step 902 and has the same appearance, in accordance with one embodiment, as the POST request discussed above for maintenance window creation. In accordance with one embodiment, webserver 214 handles the request for the maintenance window using the same method discussed above in connection with FIG. 5. At step 906, deployment ReST call module 256 submits a request to create a deployment by referencing deployment resource 210 and providing the collection identifier returned in step 902 and an update_group_identifier. In accordance with one embodiment, the submitted request for the deployment appears as:

POST/deployment URI HTTP/1.1
Content-type: application/JSON
Authorization: OAUTH access token
  key: consumer key
  update_group_id: Identifier of Update Group
  collection_id: Identifier of user or device collection that Application is to be deployed to
  suppress_reboot: 0
  start_time: Date/time to make deployment available
  enforcement_deadline: Date/Time by which devices must accept deployment
  use_gmt_times: True/False
  override_service_windows: True/False
  reboot_outside_of_service_windows: True/False
  notify_user: True/False
  deployment_description: Description of deployment where the attributes that are similar to the attributes of the POST request for the deployment of an application have the same meanings. The "update_group_id" attribute indicates the identifier of an update group which has an associated update group storage area 290 in FIG. 2. The "suppress_reboot" attribute indicates whether reboots will be allowed or if the reboots will be suppressed based upon whether the device is a workstation or a server. Upon receiving the request for the creation of the deployment based on the update, webserver 214 uses API methods 216 to create a deployment that will install the update located in update group storage 290 associated with the update group identifier to all devices represented by the collection identifier.

By providing webserver 214, the various embodiments are able to receive and satisfy requests to create application objects, collections of devices, maintenance windows and deployments in a deployment management tool while at the same preventing direct access to the deployment management tool. This reduces the number of user interface screens that the person requesting the deployment must navigate while also reducing the number of errors that the person may introduce into the deployment.

Figure 10:
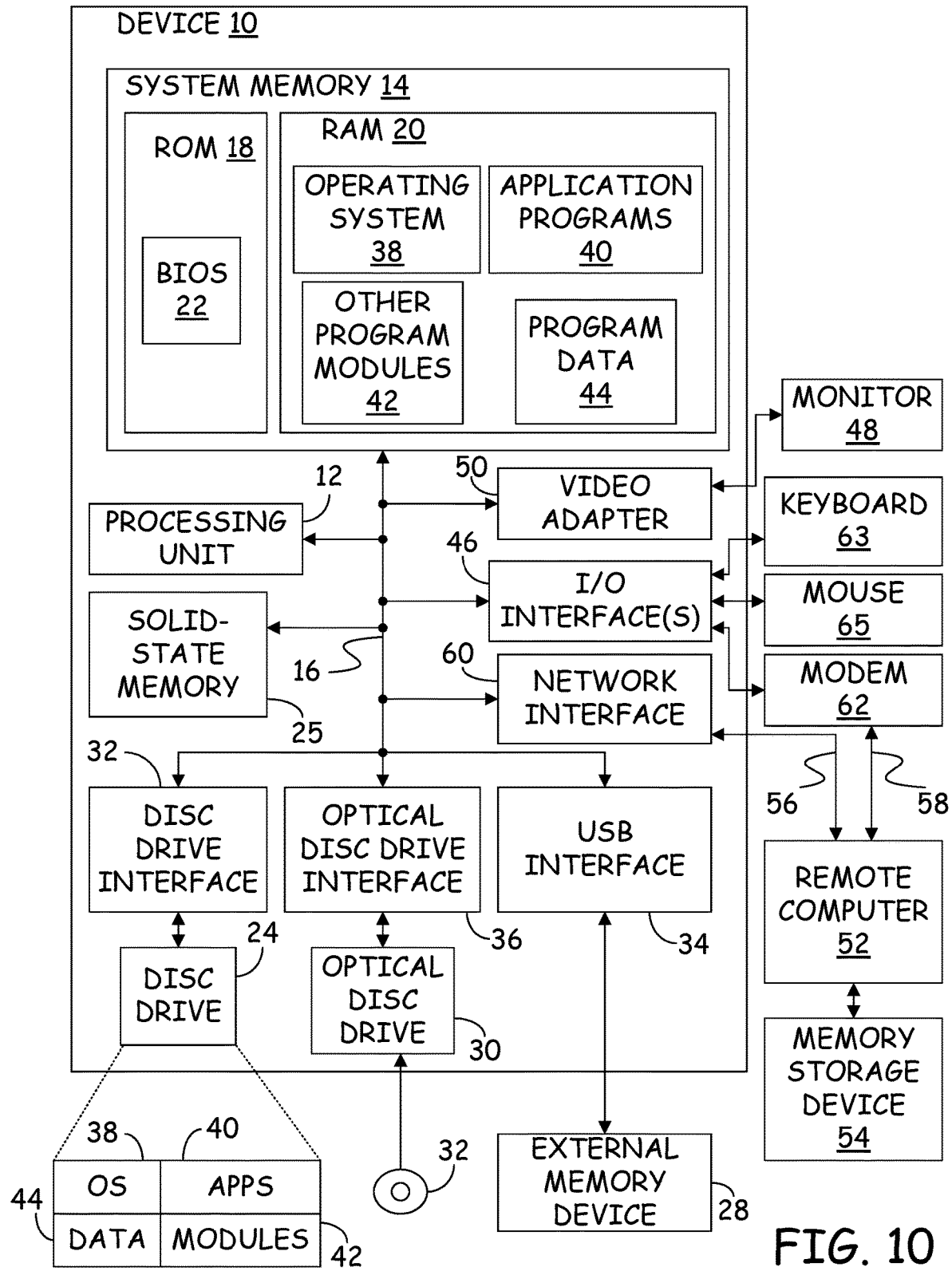
FIG. 10 is a block diagram of a computing device used in accordance with the various embodiments.

FIG. 10 provides an example of a computing device 10 that can be used as any of devices 220, 222, webserver 214, deployment management server 104, webserver 112, enterprise servers 114 and 116 and client devices 132, 134, 136, and 138 in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 10. The network connections depicted in FIG. 10 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 10 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
submitting a description of a plurality of devices to a webserver as part of a request for the creation of a collection object that represents the plurality of devices and receiving an identifier for the collection object from the webserver;
a submitter submitting attributes associated with an application to be deployed to the webserver;
while preventing direct access by the submitter to a deployment management tool, receiving the attributes associated with the application from the submitter;
calling at least one method in the deployment management tool to create an application in the deployment management tool based on the received attributes and to obtain the identifier for the created application;
returning the identifier for the created application to the submitter;
the submitter receiving the identifier for the application from the webserver; and
submitting a request to the webserver to deploy the application to the plurality of devices, the request including the identifier for the collection object and the identifier for the application and the request being independent of which deployment management tool is used to deploy the application to the devices.

2. The computer-implemented method of claim 1, wherein the description of the plurality of devices comprises a description of a plurality of users and the request to deploy the application comprises a request to deploy the application to at least one device used by each user described by the description of the plurality of users.

3. The computer-implemented method of claim 1, wherein the description of the plurality of devices comprises a rule for identifying devices in a network of devices.

4. The computer-implemented method of claim 1, wherein submitting attributes associated with the application to be deployed comprises submitting an install command for installing the application on a device.

5. The computer-implemented method of claim 1, wherein submitting attributes associated with the application to be deployed comprises providing a location of an installation bundle containing the application to be installed.

6. The computer-implemented method of claim 1, wherein the attributes associated with the application comprises an identification of a distribution point group that includes at least one application catalog.

7. The computer-implemented method of claim 1, further comprising submitting a description of a maintenance window to associate with the devices together with the identifier for the devices.

8. A method comprising:
while preventing direct access by a submitter to a deployment management tool, receiving attributes associated with an application from the submitter;
calling at least one method in the deployment management tool to create an application object in the deployment management tool based on the received attributes and to obtain an identifier for the created application object;
returning the identifier for the created application object to the submitter;
while preventing direct access by the submitter to the deployment management tool, receiving a request to create a deployment together with an identifier for a collection representing a plurality of devices and the identifier for the created application object from the submitter; and
calling at least one method in the deployment management tool to create the deployment so that the deployment is used by the deployment management tool to deploy the application to the plurality of devices represented by the identifier for the collection.

9. The method of claim 8 further comprising:
while preventing direct access by the submitter to the deployment management tool, receiving a description of devices from a submitter;
calling at least one method in a deployment management tool to create the collection based on the description of devices and to obtain the identifier for the collection; and
returning the identifier for the collection to the submitter.

10. The method of claim 8 further comprising:
while preventing direct access by a second submitter to the deployment management tool, receiving attributes associated with a second application from a second submitter;
calling at least one method in the deployment management tool to create a second application object in the deployment management tool based on the received attributes associated with the second application and to obtain an identifier for the second created application object; and
returning the identifier for the second created application object to the second submitter.

11. The method of claim 10, wherein receiving the attributes associated with the second application comprises receiving an identifier for the second submitter.

12. The method of claim 11 further comprising:
while preventing direct access by a third submitter to the deployment management tool, receiving a request from the third submitter to delete the second created application object together with an identifier for the third submitter; and
refusing to delete the second created application object because the identifier for the third submitter does not match the identifier for the second submitter.

13. The method of claim 8, wherein the attributes associated with the application comprise an install command.

14. The method of claim 8, wherein the description of devices comprises a description of the users of the devices.

15. A webserver comprising:
a memory; and
a processor executing instructions to provide:
an application resource having a uniform resource identifier and instructions for processing requests to create application objects in a deployment management tool;

a collection resource having a second uniform resource identifier and instructions for processing requests to create collections in the deployment management tool, each collection comprising a plurality of devices;
a deployment resource having a third uniform resource identifier and instructions for processing requests to create a deployment in the deployment management tool based on an application object created by referencing the application resource and a collection created by referencing the collection resource; and
instructions for processing requests to delete application objects that reference the application resource wherein the instructions prevent deletion of an application object when an identifier of a submitter requesting the deletion does not match the identifier of a submitter who requested creation of the application object.

16. The webserver of claim 15, wherein the request to create a collection comprises a query for identifying a set of devices to include in the collection.

17. The webserver of claim 15, wherein the request to create a collection comprises an identifier of a group of users to include in the collection.

18. The webserver of claim 15 further comprising:
a maintenance window resource having a fourth uniform resource identifier and instructions for processing requests to create a maintenance window for a collection in the deployment management tool.

* * * * *